April 26, 1960   G. R. DEMPSTER ET AL   2,934,227
CHASSIS MOUNTED HOISTING AND DUMPING EQUIPMENT
Filed Feb. 18, 1957   3 Sheets-Sheet 1
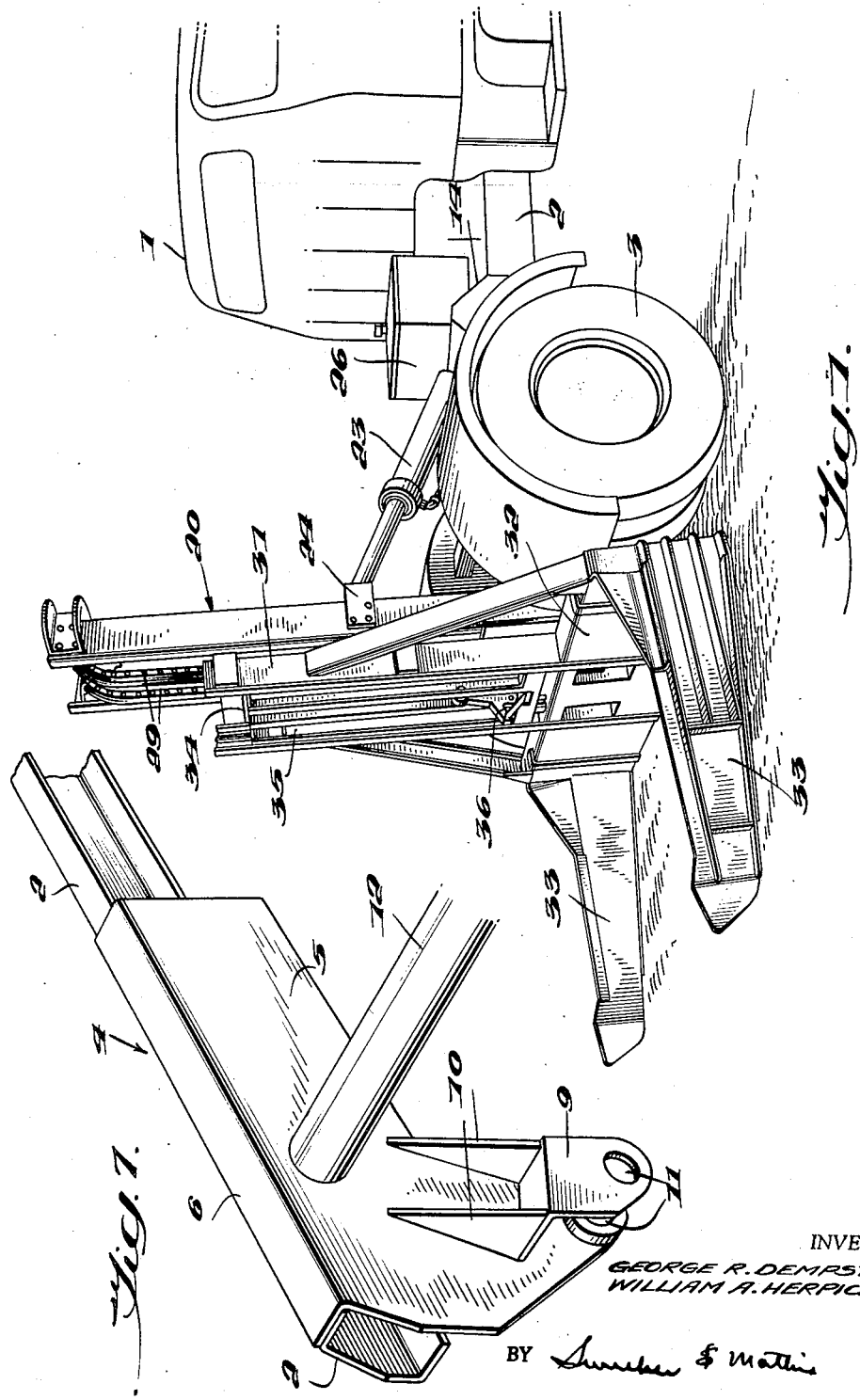
INVENTORS
GEORGE R. DEMPSTER,
WILLIAM A. HERPICH,
BY
ATTORNEYS

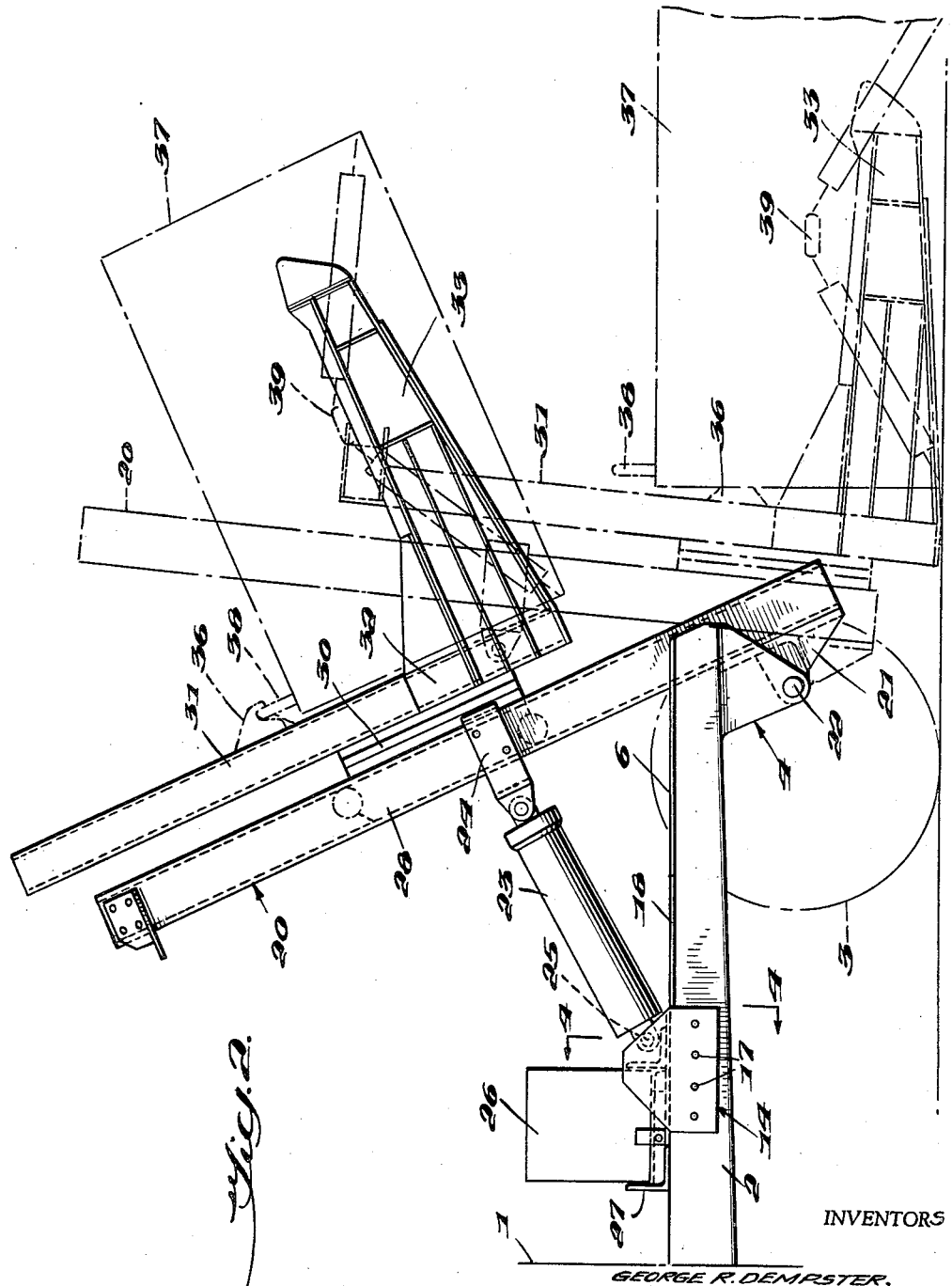

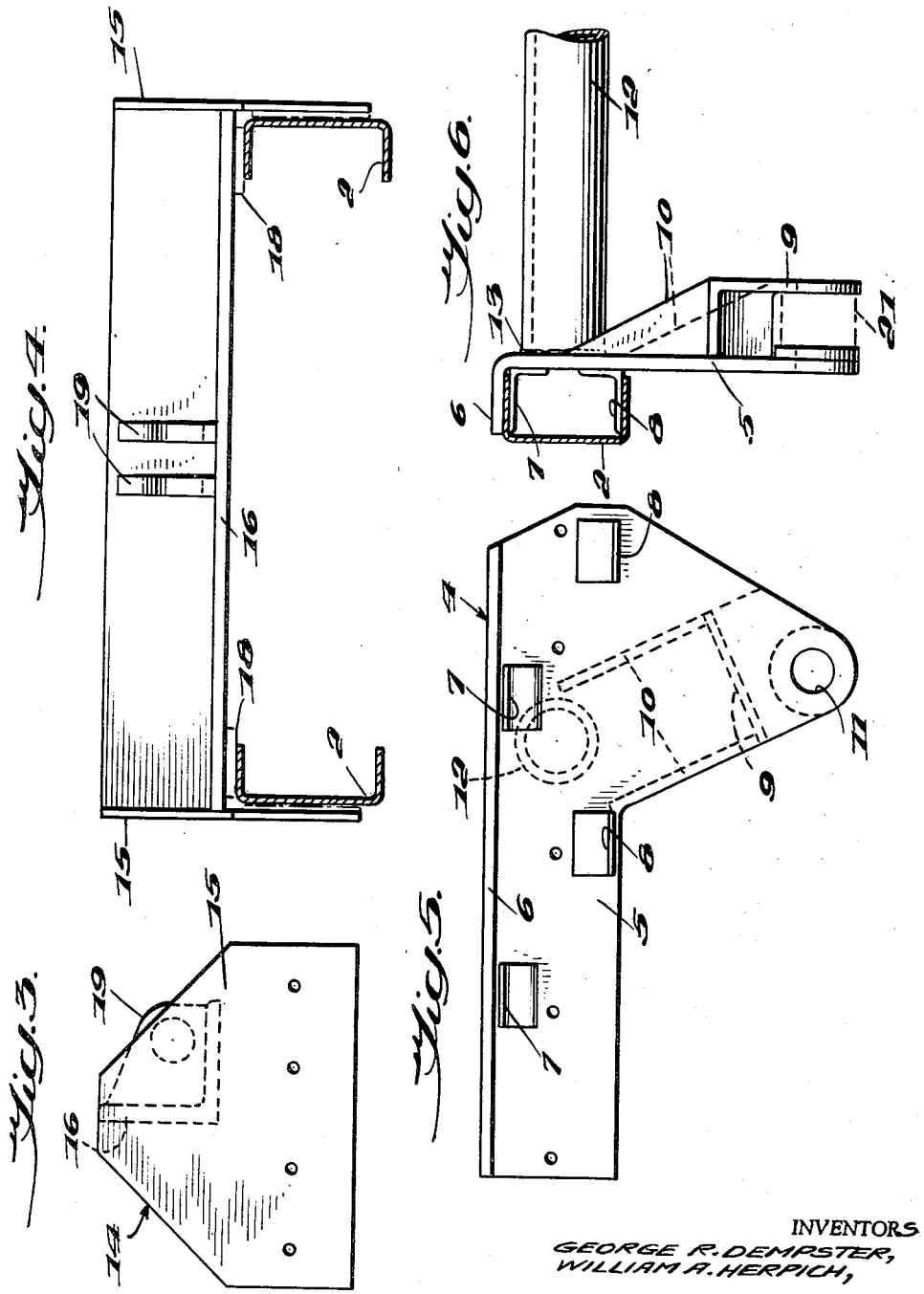

United States Patent Office 2,934,227
Patented Apr. 26, 1960

2,934,227
CHASSIS MOUNTED HOISTING AND DUMPING EQUIPMENT

George R. Dempster and William A. Herpich, Knoxville, Tenn.; said Herpich assignor to Dempster Brothers, Inc., Knoxville, Tenn., a corporation of Tennessee Application February 18, 1957, Serial No. 640,958

5 Claims. (Cl. 214—317)

This invention relates to improvements in chassis mounted hoisting and dumping equipment, and more particularly to attachments for vehicles for transporting and dumping detachable containers.

Devices provided heretofore for transporting and dumping detachable containers usually have required frame structures mounted on the vehicle chassis, which were complex, expensive to build and to install, and which added materially to the weight imposed on the vehicle chassis. In some instances fork lift devices have been used for handling detachable containers, but these have required special mounting on modifications of the chassis that render the device complex and expensive.

One object of this invention is to simplify and improve the construction of hoisting and dumping equipment for detachable containers to enable the same to be mounted on the chassis of a motor vehicle and to provide a secure mounting therefor.

Another object of the invention is to provide mountings for a fork lift assembly which may be applied directly and readily to the chassis of a motor vehicle and which will function to lift, transport and dump detachable containers.

Still another object of the invention is to improve the construction of fork lift devices so as to permit the mounting thereof on a vehicle chassis and the effective operation for picking up, transporting and dumping detachable containers.

These objects may be accomplished according to one embodiment of the invention by providing fulcrum brackets applied directly on the chassis frame and secured thereto at the rear end portion of said frame with a separate mounting also applied to the chassis frame spaced forwardly thereof from the fulcrum brackets. A fork lift assembly is supported on the fulcrum brackets and is mounted thereon for swinging movement to forward and rearward positions with respect thereto by a device which interconnects the fork lift assembly with the mounting bracket on the chassis frame. A hydraulic cylinder may be used for this purpose. The fork lift assembly not only is provided with fork arms for supporting the container and are capable of raising and lowering said container to different elevations, but it also has means thereon in position for engaging a bail on the container for holding the body of the container elevated during dumping as the lift arms are lowered relative thereto.

This embodiment of the invention is illustrated in the accompanying drawings, in which:

Fig. 1 is a perspective view of a vehicle showing the container lifting and dumping equipment applied thereto;

Fig. 2 is a side elevation thereof illustrating in full lines and in dotted lines the different positions of the hoisting unit and container;

Fig. 3 is a side elevation of the cylinder mounting, detached;

Fig. 4 is an elevation thereof applied to the chassis frame shown in section, taken on the line 4—4 in Fig. 2;

Fig. 5 is a side elevation of the fulcrum bracket, detached;

Fig. 6 is a view at right angles thereto applied to the chassis frame, which is shown in section; and Fig. 7 is a detailed perspective view of the fulcrum bracket applied.

The invention is shown as applied to a motor vehicle truck chassis which is self-propelled and power driven. The operator is usually located in a cab, generally indicated by the numeral 1, from which the chassis frame extends rearwardly as shown at 2, and is supported at the rear by power-driven wheels indicated at 3. The chassis frame usually is formed of a pair of channel members suitably braced and supported on the wheels 3. It is often desirable to cut off or remove the rear end portions of the chassis members 2 so as to locate the point of support as nearly as possible to a vertical plane through the axis of the rear wheels 3, or forwardly of said plane.

Mounted on the rear ends of the chassis frame members 2 are fulcrum brackets, generally indicated at 4 and shown more in detail in Figs. 5 to 7. One of the fulcrum brackets is provided for each chassis frame member, and together the pair of brackets support the transporting and dumping mechanism.

Each bracket 4 comprises an upright plate 5 having an out-turned flange 6 along the upper edge thereof in position to be seated upon the upper face of the corresponding chassis frame member 2. The bracket 5 is anchored to the chassis member 2 by upper and lower clips 7 and 8, and in addition may be welded, bolted or otherwise fastened thereto.

The bracket plate 5 is substantially L-shaped with a down-turned portion thereon, as shown in Figs. 2, 5 and 7. This down-turned portion has a clip bracket 9 applied to the inner face of the bracket plate 5 and braced by triangular plates 10 that extend from the clip bracket 9 upwardly along the inner face of the fulcrum bracket plate 5. These parts may be welded or otherwise fastened together and form a secure bracket assembly for supporting the hoisting means thereon. Holes 11 are formed in the down-turned portion of the fulcrum bracket plate 5 and in the clip bracket 9 to receive a mounting 21 for the hoisting unit.

The fulcrum brackets 4 on opposite sides of the vehicle chassis are connected together by a torque bar or tube 12 which extends therebetween. This bar 12 is located intermediate the length of each plate 5, as viewed in Figs. 5 and 7, and should be secured rigidly thereto in any suitable manner, such for example, as by welding at 13 (Fig. 6). This torque bar 12 not only holds the fulcrum brackets 4 spaced apart at the rear end of the chassis, but it also serves to prevent relative shifting of these brackets with respect to each other.

Also located on the chassis members 2 at points spaced forwardly from the fulcrum brackets 4 is a cylinder mount generally indicated at 14 and shown more in detail in Figs. 3 and 4. This cylinder mount is a unitary construction which straddles the chassis frame and is seated thereon.

The cylinder mount comprises a pair of upright side plates 15 in positions to embrace the chassis frame member 2 and are spaced apart by an angle bar 16 extending therebetween. These parts may be welded or otherwise secured together in rigid unitary construction. The plates 15 should be bolted to the sides of the chassis frame member 2 as shown at 17 in Fig. 2. Bars 18 may be interposed if desired between the upper faces of the chassis frame members 2 and the cylinder mount 14. The angle bar 16 is shown in Fig. 4 as seated upon these bars 18, which latter rest upon the upper faces of the chassis frame member 2.

The angle bar 16 is provided with a pair of spaced ears 19 intermediate the length thereof for anchoring one end of the cylinder thereto.

The elevating means for the container comprises an upright carriage, generally indicated at 20 and shown in Figs. 1 and 2. This upright carriage may be of the usual construction provided on fork lift assemblies. The lower end of the carriage 20 is provided with brackets 21 rigidly secured thereto and connected by pivots 22 with the fulcrum brackets 4. The brackets 21 each extends between the down-turned portion of the plate 5 and the clip bracket 9 of each fulcrum bracket, as indicated in dotted lines in Fig. 6. These parts may be pivotally connected together by inserting the fulcrum pin 22 through the holes 11 shown in Figs. 5 and 7, which thereby anchors the upright carriage to the fulcrum bracket for swinging movement to different positions with respect to the truck chassis as indicated in full lines and dotted lines in Fig. 2.

Suitable means should be provided for swinging the upright carriage 20 on the pivot pins 22. We have illustrated such swinging means by a hydraulic cylinder 23, the piston rod end of which assembly is connected with an adapter bracket 24 on the upright carriage 20, while the opposite end of the cylinder assembly 23 is pivotally connected at 25 with the cylinder mount 14. A lug is usually provided on the closed lower end of the cylinder 23 which can be inserted between the ears 19 on the mount 14 and connected thereto by a pivot pin 25 inserted through the lug and through the openings in the ears.

A suitable source of hydraulic fluid is usually provided in a tank, indicated at 26, mounted on a head frame 27 on the chassis frame 2 and confined between the head frame 27 and on the angle bar 16 of the cylinder mount 14.

The upright carriage 20 preferably comprises the usual means for raising and lowering fork arms of a fork lift assembly. An elevator is indicated generally at 28 in Fig. 2 and is moved up and down in the carriage guides, usually by hoisting chains shown at 29 in Fig. 1, operated hydraulically or in other suitable manner. The elevator 28 has secured thereto a fork mounting section 30. Secured rigidly to the other face of the fork mounting section 30 is a pair of upright guides 31 and a laterally extending beam section 32. Fork arms 33 are secured to the outer ends of beam section 32.

Mounted within the upright guides 31 is a shuttle, generally indicated at 34, adapted for relative vertical movement with respect to the guides 31. Hydraulic cylinders, indicated at 35 in Fig. 1, may be used for sliding the shuttle 34 vertically with respect to the guides 31. This assembly may be constructed and operated in the manner set forth more in detail in the Dempster et al. patent, No. 2,751,100, granted June 19, 1956.

The shuttle 34 is provided with an automatic hook, generally indicated at 36, in suitable position thereon for engaging and supporting the body of the container during dumping. The hook may be constructed in the form set forth in Dempster patent, No. 2,445,106, granted July 13, 1948, or in other suitable form as desired.

The container is shown in Fig. 2 and illustrated generally at 37 having a body portion constructed with a drop bottom door, as an example of one of the many forms of containers with which the present equipment is capable of use. The body portion of the container 37 is provided with a bail 38 affixed thereto, while the drop bottom door on the container has the usual lifting pins 39.

Normally the container 37 is adapted to be filled standing on the ground or on the floor. The vehicle is moved up to the container with the fork arms 33 in the lower positions as illustrated in Fig. 1 and in dotted lines in Fig. 2. These arms 33 are spaced apart substantially to straddle the length of the container but to engage with the lifting pins 39 when the arms are raised. After thus moving the lifting arms 33 into position under the lifting pins 39, the hydraulic cylinder assembly 23 can be operated to swing the entire hoisting assembly from the dotted line position shown in Fig. 2 to the full line position therein. This will raise the container sufficiently off the ground or floor to enable the vehicle to move, and in many instances the container can be transported in this position. If desired, however, the hoisting means 29 can be operated to lift the elevator 28 and the fork arms 23 connected therewith and thereby raise the container 37 to the position shown in full lines in Fig. 2.

After transportation of the container to the point of dumping, the shuttle 34 can be operated to move the automatic hook 36 into engagement with the bail 38 so as to hold the body of the container elevated during dumping. Then upon lowering of the fork arms 33 relative to the shuttle 34, the drop bottom door is opened and the contents discharged. A similar operation may be used for dumping other types of containers not provided with the drop bottom door, such as the tip-over or skip type of container.

Then the operation may be reversed to disengage the bail from the hook 36 and the container is returned to the point of use. Upon reversing the operation the container may be set down on the ground or floor, and the hoisting unit moved to another container, which is picked up and transported to the point of dumping, as described.

This construction makes it possible to apply a fork lift unit either to a conventional or special truck chassis in a very simple and inexpensive mounting assembly which does not require appreciable modification of the truck chassis, nor does it make necessary a complex hoisting unit mounted on the chassis. Nevertheless the fork assembly is sufficient and so mounted as to handle detachable and dumping containers.

While the invention has been illustrated and described in one embodiment, it is recognized that variations and changes may be made therein without departing from the invention as set forth in the claims.

We claim:

1. In transporting and dumping equipment for a dumping container, the combination with a motor vehicle having a chassis frame including laterally spaced side members, of fulcrum brackets on the rear end portion of the chassis frame, each of the fulcrum brackets comprising an upright plate having a laterally turned flanged portion on the upper edge thereof seated upon the adjacent chassis frame side member, means connecting the plate to said side member, a clip bracket spaced laterally from the plate and secured thereto, an upright carriage at the rear end of the chassis frame, a bracket connected with the lower end portion of the upright carriage, a journal pin connecting the carriage bracket with the plate and clip bracket of each fulcrum bracket, and means on the upright carriage for lifting and dumping the container.

2. In transporting and dumping equipment for a dumping container, the combination with a motor vehicle having a chassis frame including laterally spaced side members, of fulcrum brackets mounted on the respective side members at the rear end portions thereof, an upright carriage at the rear end portion of the chassis frame, means pivotally connecting the upright carriage with the fulcrum brackets, a mounting assembly on the chassis frame spaced forwardly thereof from the fulcrum brackets, and including a member extending transversely over the chassis frame, a device interconnecting said last-mentioned member with the upright carriage for tilting movement of the carriage relative to the chassis frame, and means on the upright carriage for lifting and dumping the container.

3. In transporting and dumping equipment for a dumping container, the combination with a motor vehicle having a chassis frame, of fulcrum brackets mounted on the chassis frame adjacent the rear end thereof, an upright carriage at the rear end of the chassis frame, means pivotally connecting the upright carriage with the fulcrum brackets, a mounting bracket assembly on the chassis frame spaced forwardly thereof from the fulcrum brackets, said bracket assembly including upright plates and a connecting bar extending therebetween over the chassis frame, a hydraulic power device extending from the connecting bar to the upright carriage for tilting said carriage forward and backward with respect to the chassis frame, and means connected with the upright carriage for lifting and dumping the container.

4. In transporting and dumping equipment for a dumping container, the combination with a motor vehicle having a frame, of fulcrum brackets mounted on the frame adjacent an end thereof, an upright carriage at said end of the frame, means pivotally connecting the upright carriage with the fulcrum brackets, a mounting bracket assembly on the frame spaced lengthwise thereof from the fulcrum brackets, said bracket assembly including upright plates vertically overlapping the vehicle frame and a connecting bar extending therebetween over the frame and connected at opposite ends thereof with the upright plates, a hydraulic power device extending from the connecting bar to the upright carriage for tilting said carriage forward and backward with respect to the frame, and means connected with the upright carriage for lifting and dumping the container.

5. In transporting and dumping equipment for a dumping container, the combination with a motor vehicle having laterally spaced side members, of fulcrum brackets on an end portion of the vehicle, each of the fulcrum brackets comprising an upright plate having a laterally turned flanged portion on the upper edge thereof seated upon the adjacent side member, means connecting the plate to said side member, a clip bracket spaced laterally from the plate and secured thereto, an upright carriage at the rear end of the chassis frame, a bracket connected with the upright carriage, a journal pin connecting the carriage bracket with the plate and clip bracket of each fulcrum bracket, and means on the upright carriage for lifting and dumping the container.

References Cited in the file of this patent

UNITED STATES PATENTS

| | | |
|---|---|---|
| 2,413,661 | Stokes | Dec. 31, 1946 |
| 2,606,676 | Dempster | Aug. 12, 1952 |
| 2,626,070 | Ezell et al. | Jan. 20, 1953 |
| 2,696,923 | Messick | Dec. 14, 1954 |
| 2,723,771 | Brown | Nov. 15, 1955 |
| 2,751,100 | Dempster et al. | June 19, 1956 |
| 2,822,938 | Ormsby | Feb. 11, 1958 |